(12) United States Patent
Aoki

(10) Patent No.: US 6,794,638 B2
(45) Date of Patent: Sep. 21, 2004

(54) PHOTOELECTRIC ENCODER HAVING IMPROVED LIGHT-EMITTING AND PHOTORECEPTIVE SECTIONS

(75) Inventor: Toshihiko Aoki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 183 days.

(21) Appl. No.: 10/233,420

(22) Filed: Sep. 4, 2002

(65) Prior Publication Data

US 2003/0048536 A1 Mar. 13, 2003

(30) Foreign Application Priority Data

Sep. 13, 2001 (JP) .................................... 2001-277674

(51) Int. Cl.$^7$ ............................................... G01D 5/34
(52) U.S. Cl. .............................. 250/231.13; 250/237 G
(58) Field of Search ....................... 250/231.13, 237 G, 250/237 R, 231.16, 231.18; 341/11, 13

(56) References Cited

U.S. PATENT DOCUMENTS 5,155,355 A    10/1992  Kabaya
5,889,280 A  *  3/1999  Matsuura ................ 250/237 G

* cited by examiner

Primary Examiner—Que T. Le
(74) Attorney, Agent, or Firm—Oliff & Berridge, PLC

(57) ABSTRACT

A flat illuminant emits a beam of light toward a reflective scale having predetermined reference gratings formed thereon. A photoreceptive module is placed at a location between the flat illuminant and the reflective scale and closer to the flat illuminant. The photoreceptive module includes an array of photoreceptive devices, which also serves as illuminant-side gratings for partially shielding the beam from the flat illuminant.

10 Claims, 11 Drawing Sheets

PHOTOELECTRIC ENCODER HAVING IMPROVED LIGHT-EMITTING AND PHOTORECEPTIVE SECTIONS

CROSS-REFERENCE TO PRIOR APPLICATION

This application is based upon and claims the benefit of priority from the prior Japanese Patent Application No. 2001-277674, filed on Sep. 13, 2001, the entire content of which is incorporated herein by reference.

BACKGROUND OF THE INVENTION

1. Field of the Invention

The present invention relates to a photoelectric encoder, more particularly to an improvement to light-emitting and photoreceptive sections in the photoelectric encoder.

2. Description of the Related Art

A photoelectric encoder has been employed in a variety of machine tools and measuring instruments and the like, to detect a relative displacement between two relatively-moving members. The photoelectric encoder includes a light-emitting device such as an LED for emitting a beam of light to illuminate a scale. It also includes a photoreceptive device such as a photodiode for receiving the beam transmitted through, diffracted or reflected at the scale to detect an amount of a subjective displacement based on the condition of the received beam. In accordance with the need for downsizing an instrument that includes the photoelectric encoder mounted thereon, it is strongly desired to downsize the photoelectric encoder itself.

For the purpose of responding to the need, a known photoelectric encoder includes light-emitting devices and photoreceptive devices monolithically formed on the same IC substrate. Such the monolithic formation has a problem, however, because the yield of the whole product is influenced from both yields of the light-emitting and photoreceptive devices and accordingly lowered, resulting in a high price product. In addition, the monolithic formation possibly damages the light-emitting and photoreceptive devices if the devices contact with the scale because they oppose to the scale in a bare state.

On the other hand, there is another method of manufacturing light-emitting devices and photoreceptive devices individually followed by hybrid implementation. It is required in this case to prepare individual support members for the light-emitting devices and the photoreceptive devices, preventing the downsizing.

SUMMARY OF THE INVENTION

The present invention is provided with a photoelectric encoder, comprising: a reflective scale having predetermined reference gratings formed thereon; a flat illuminant having a flat surface emitting a beam of light to illuminate over said scale; a light transmissive member placed at a location between said flat illuminant and said reflective scale and closer to said flat illuminant; illuminant-side gratings formed at said light transmissive member and placed at front surface of said flat illuminant; and a photoreceptive device array consisting of a plurality of photoreceptive devices formed inside or outside of said light transmissive member for receiving said beam from said flat illuminant through said illuminant-side gratings and said reference gratings.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings, in which.

DETAILED DESCRIPTION OF THE PREFERRED EMBODIMENTS

Embodiments of the present invention will be described next on the basis of the drawings.

[First Embodiment]

Figure 1:
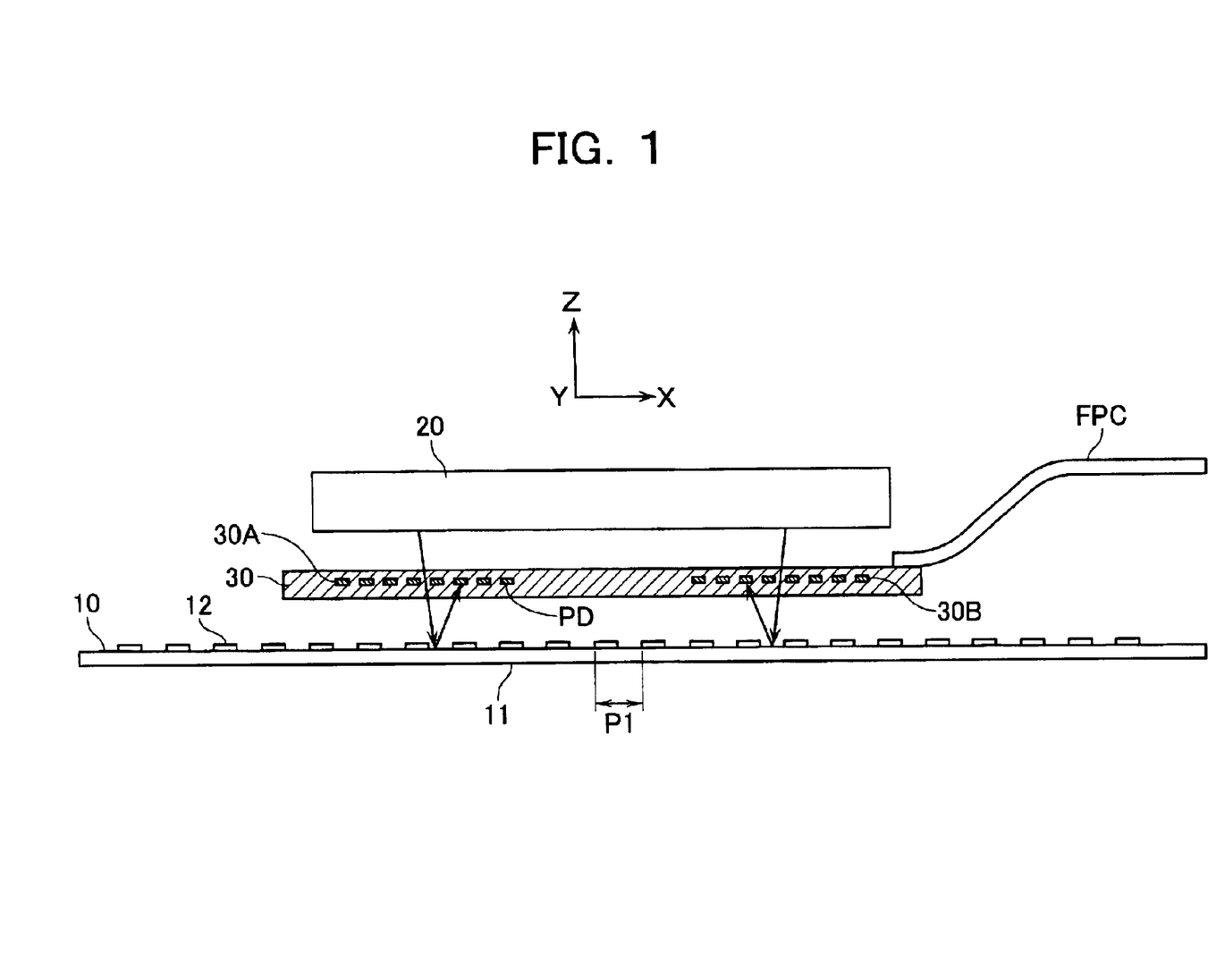
FIG. 1 shows an arrangement of a photoelectric encoder according to a first embodiment of the present invention.

FIG. 1 shows an arrangement of a reflective photoelectric encoder according to a first embodiment of the present invention. The photoelectric encoder of this embodiment comprises a reflective scale 10, a flat illuminant 20 for emitting a light to illuminate the reflective scale 10, and a photoreceptive module 30 for modulating and receiving the light reflected from the scale 10.

The reflective scale 10 includes a scale substrate 11, which has reference gratings 12 formed thereon at a certain pitch P1 and elongated in the direction normal to the drawing (Y-axial direction). A flat light-emitting diode is suitable for the flat illuminant 20. A flat laser diode and an organic or inorganic EL device are also available.

The photoreceptive module 30 is placed against the scale 10 with a certain gap therebetween. It is movable together with the illuminant 20 relative to the scale 10 in the direction of the arrow x of FIG. 1.

As shown in FIG. 1, the photoreceptive module 30 includes photoreceptive device arrays 30A and 30B each formed by a plurality of photoreceptive devices PD arrayed at a certain interval in the x-axis direction. The photoreceptive device arrays 30A and 30B are arranged in such a manner that the signals detected by each array differ by 90° in phase. This arrangement enables them to detect a direction of the displacement as well as an amount of a displacement.

Figure 2:
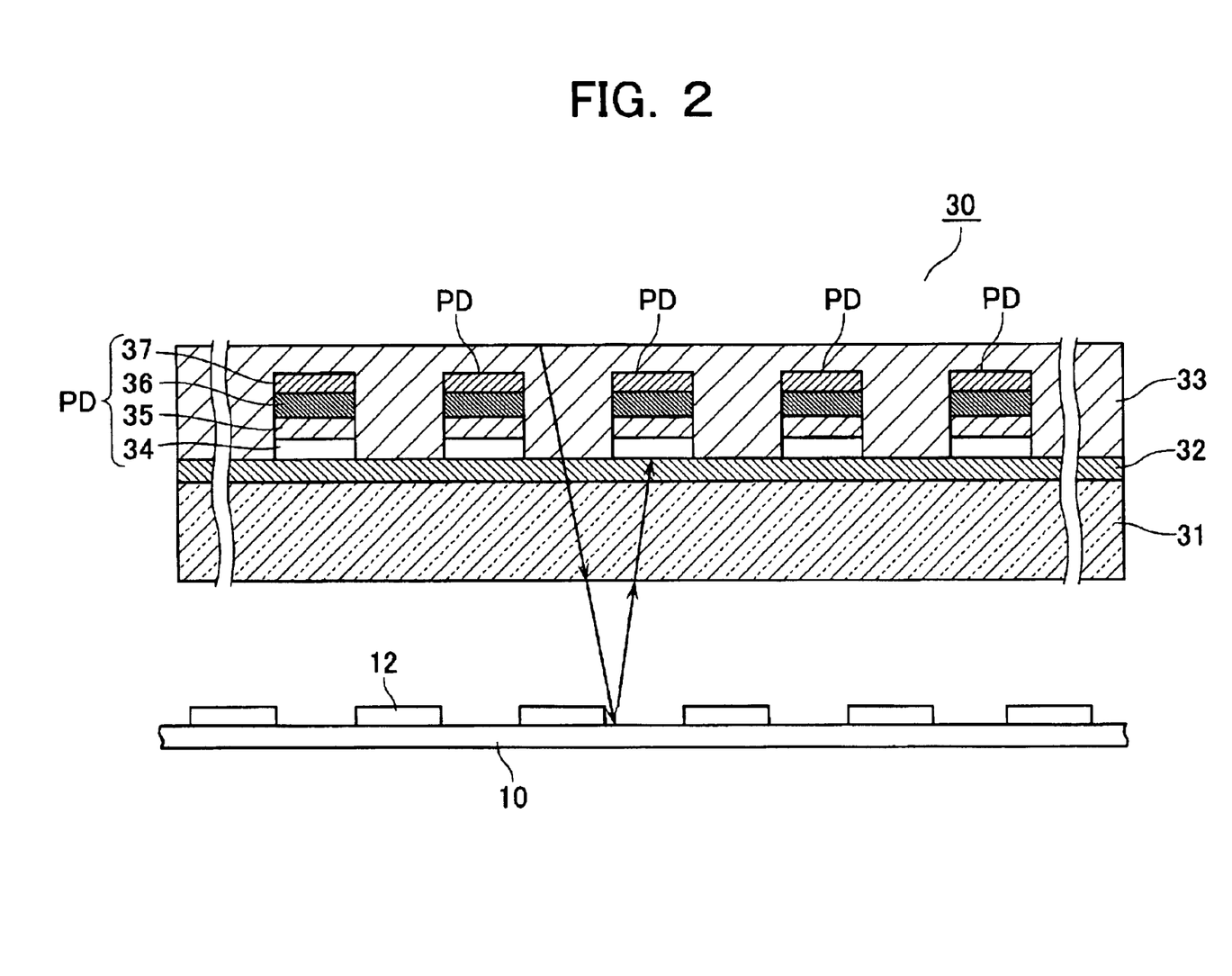
FIG. 2 shows a structure of a photoreceptor module 30 for use in the first embodiment.

The photoreceptive device PD may include a pin photodiode, as shown in FIG. 2, which consists of a transparent electrode 32 such as ITO, SnO2, ZnO as a common lower electrode, a p-semiconductor layer 34, an i-semiconductor layer 35, an n-semiconductor layer 36 and a metallic film 37 as an upper electrode. It may have a PN structure instead. Each of photoreceptive devices PD is arranged at a certain interval in the form of a strip elongated in the direction normal to the drawing (Y-axis direction). These photoreceptive devices PD can be formed through processes of: deposition of the transparent electrode 32, p-semiconductor layer 34, i-semiconductor layer 35, n-semiconductor layer 36 and metallic film 37 over a transparent substrate 31 in this order; resist application; exposure and development; and etching. Alternatively, a glass substrate having a plurality of trenches formed therein may be employed to bury the photoreceptive devices PD in the trenches.

The photoreceptive device arrays 30A and 30B are covered in a passivating film 33 composed of a transparent material.

Figure 3:
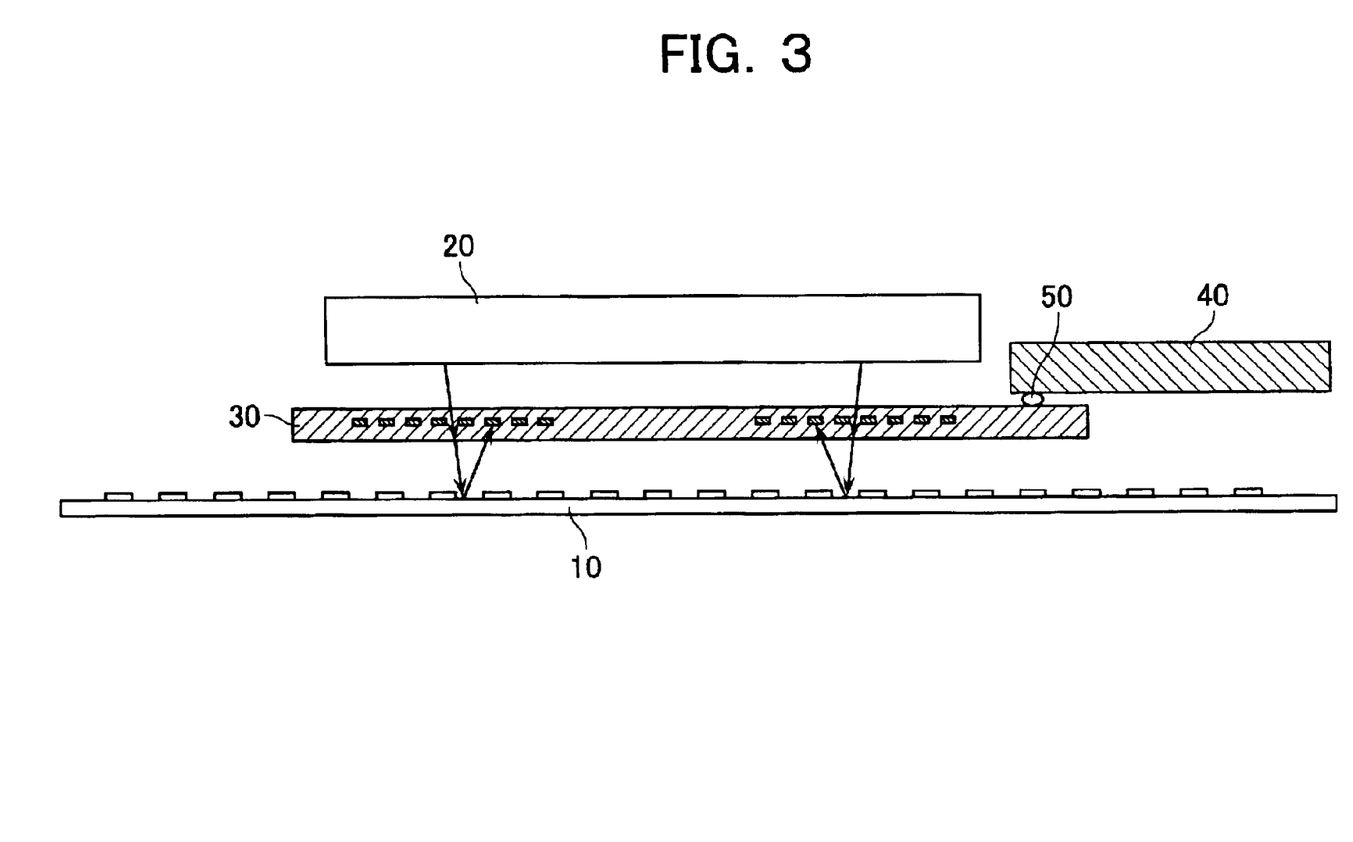
FIG. 3 shows a method of connecting the photoreceptor module 30 for use in the first embodiment to a circuit substrate 50.
Figure 4:
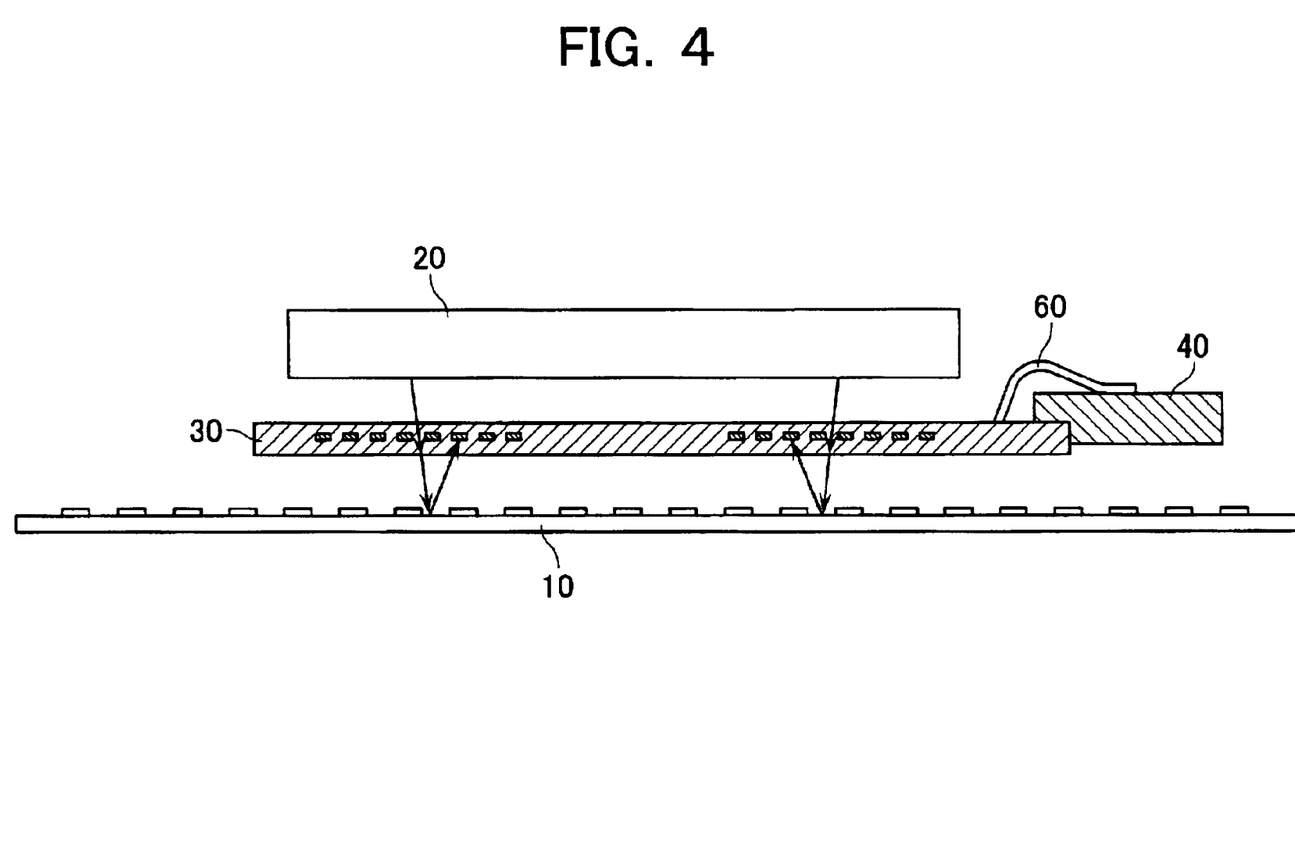
FIG. 4 shows another method of connecting the photoreceptor module 30 for use in the first embodiment to the circuit substrate 50.

When a beam of light enters each photoreceptive device PD, a detected signal appears on the metallic film 37. The signal is transferred through a flexible printed circuit FPC to an interpolation circuit and a signal processing circuit, not depicted, to detect an amount of a relative displacement of the scale 10 and a direction of the displacement. The flexible printed circuit FPC is electrically connected to the photoreceptive module 30 via an anisotropic conductive tape. Instead of the use of the flexible printed circuit FPC, the photoreceptive module 30 may be connected via a solder or gold bump 50, as shown in FIG. 3, to a circuit substrate 40 that includes the interpolation and signal processing circuits mounted thereon. Alternatively, the photoreceptive module 30 may be connected to the circuit substrate 40 through wire bonding 60 as shown in FIG. 4.

The passivating film 33 is composed of a transparent material while the metallic film 37 an opaque material. Therefore, the passivating film 33 and the metallic film 37 serve as illuminant-side gratings that allow the beam from the flat illuminant 20 to partially transmit therethrough.

The illuminant-side gratings have grating windows each serving as a secondary illuminant that transmits the beam from the flat illuminant 20 while modulating it. The transmitted beam further transmits the transparent electrode 32 and transparent substrate 31 and is reflected at the scale 10 having the reference gratings 12. The reflected beam transmits the transparent substrate 31 and transparent electrode 32 and is received at the photoreceptive device PD. As the photoreceptive module 30 having the illuminant-side gratings moves, variations occur in light and dark patterns of images reflected from the scale 10. Accordingly, it is possible to detect an amount and direction of a relative movement of the scale 10 by studying the manner of the variations.

Thus, it is possible in this embodiment to manufacture the flat illuminant 20 and the photoreceptive module 30 in individual process steps and assemble a photoelectric encoder only with each accepted part.

Therefore, a yield can be improved and a production cost can be reduced compared to the monolithic manufacture of the light-emitting and photoreceptive sections. In addition, the flat light-emitting diode can be located in the vicinity of the flat photoreceptive module without damaging possibility. This is effective to downsize the apparatus. Further, the flat illuminant 20 and the photoreceptive module 30 have opposite surfaces that are both flat. Therefore, they can be easily combined together using the anisotropic conductive tape or solder bump without the need for an individual support mechanism for the flat illuminant.

In the above embodiment, two-phase sine wave signals with A- and B-phases are generated. In addition to these A- and B-phases, their 180°-reversed /A- and /B-phase signals may be generated to provide four-phase sine wave signals. If it is not required to know the direction of the displacement, either of the photoreceptive device arrays 30A and 30B may be omitted to obtain a single-phase sine wave signal.

[Second Embodiment]

Figure 5:
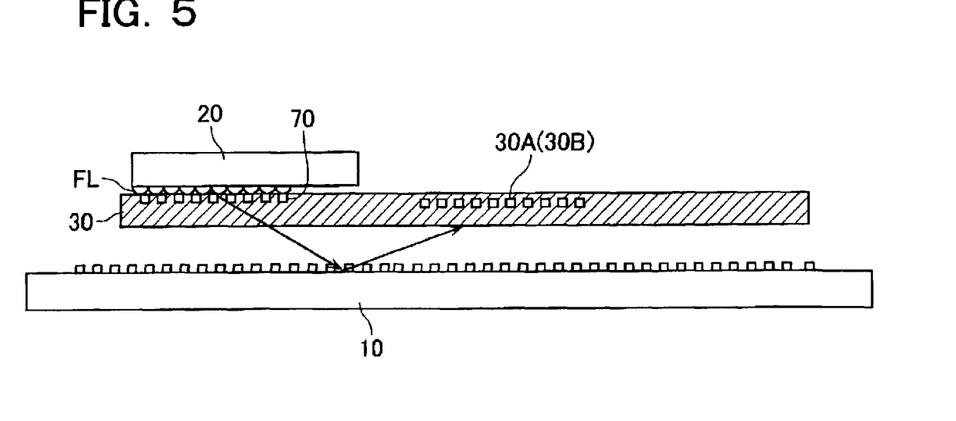
FIG. 5 shows an arrangement of a photoelectric encoder according to a second embodiment of the present invention.

A second embodiment of the present invention will now be described with reference to FIGS. 5 to 7. In the first embodiment, the photoreceptive device arrays 30A, 30B also serve as the illuminant-side gratings. To the contrary, in the second embodiment, as shown in FIG. 5, illuminant-side gratings 70 are additionally located at the side of the photoreceptive device array 30A (30B). In other words, the photoreceptive device array 30A (30B) also serves as the illuminant-side gratings in the first embodiment but not in the second embodiment.

Fresnel lens FL for deflecting a beam of light may be located in between the flat illuminant 20 and the photoreceptive device array 30A (30B) to introduce the beam reflected from the reference gratings 12 into the photoreceptive device array 30A (30B) located at the side of the lens.

Figure 6:
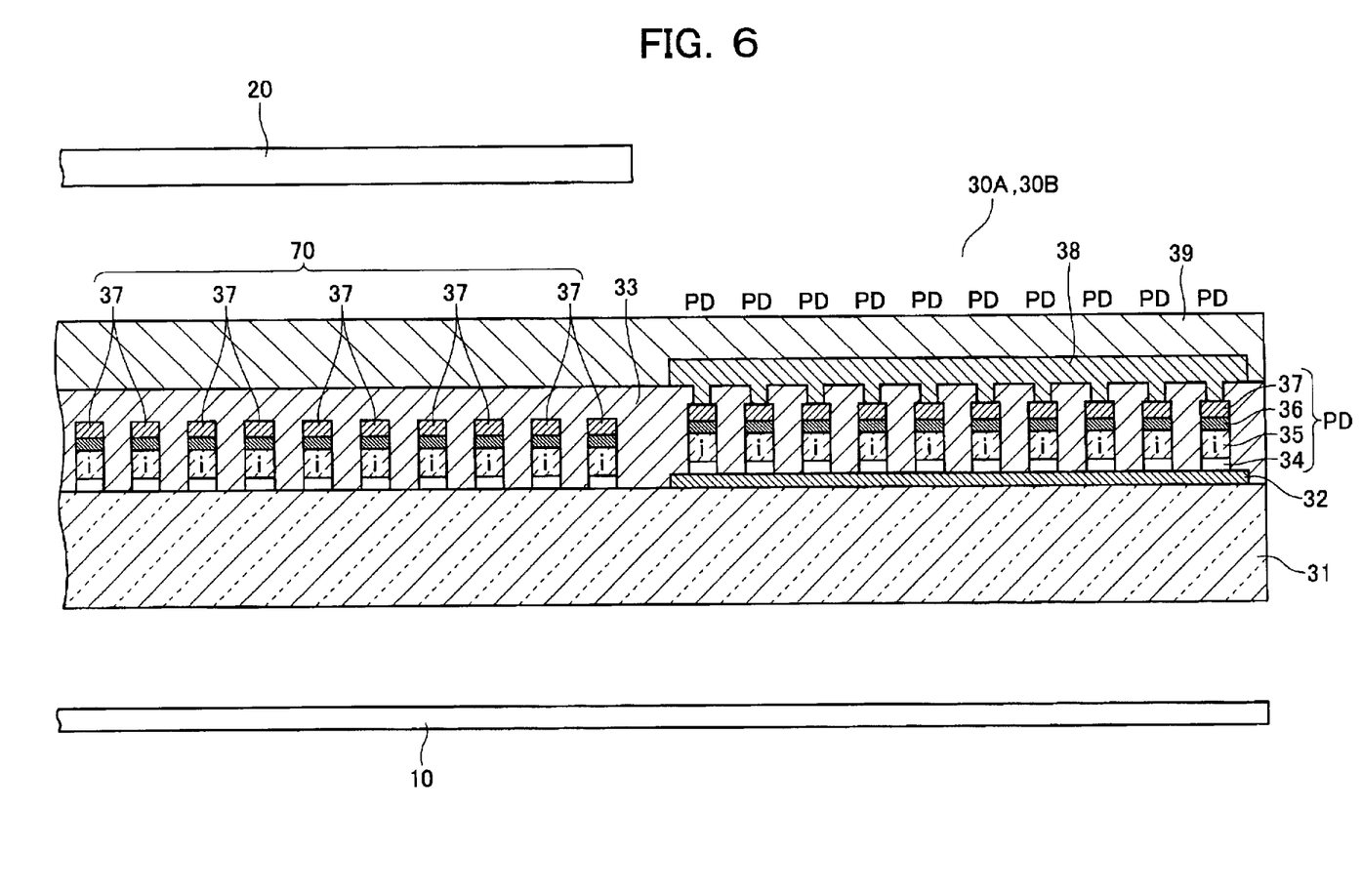
FIG. 6 exemplifies an example of a cross-sectional structure of photoreceptive module 30 shown in FIG. 5.
Figure 7:
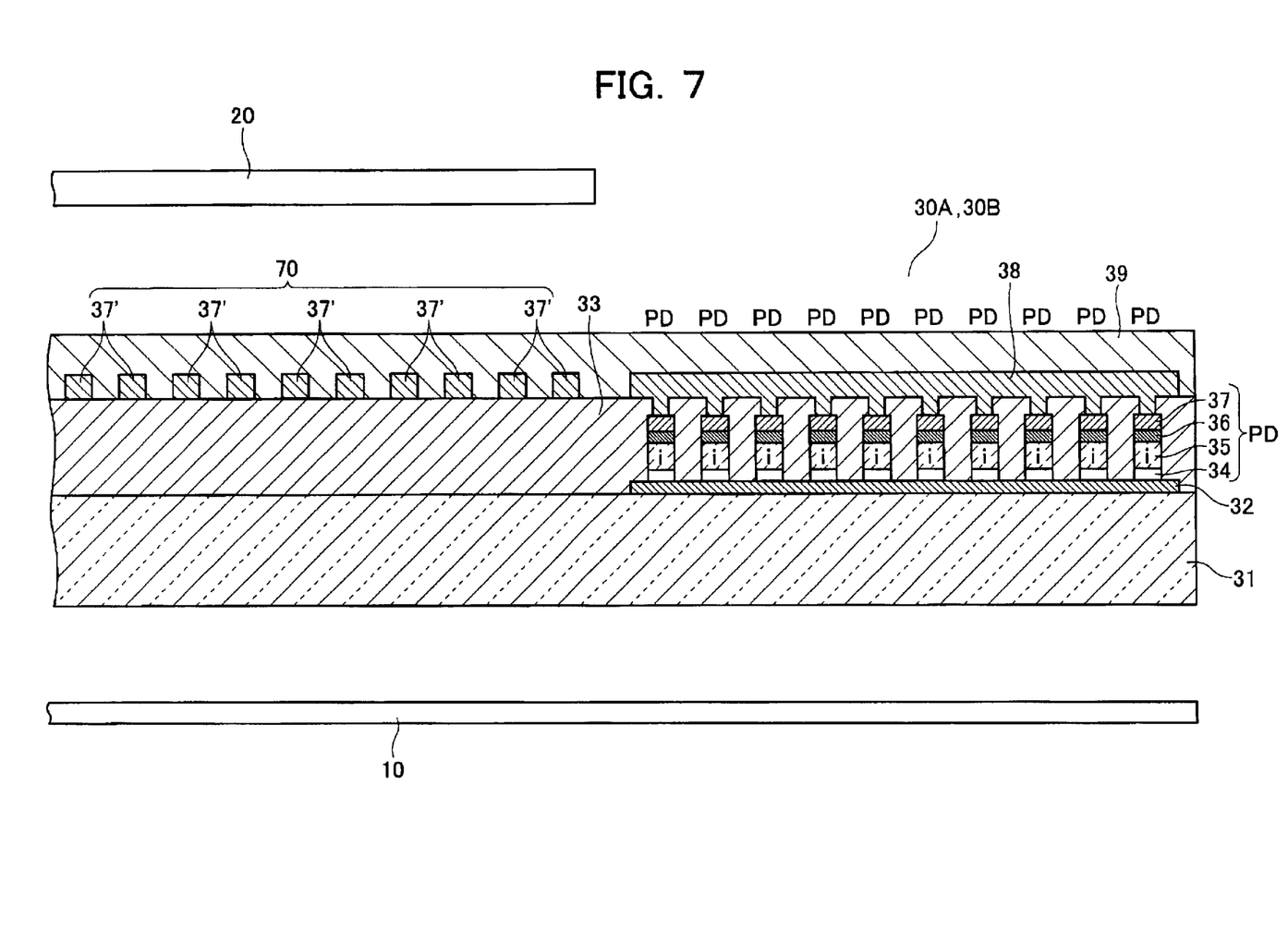
FIG. 7 shows another example of across-sectional structure of photoreceptive module 30.

FIG. 6 denotes cross-sectional structure of photoreceptive module 30.

A transparent electrode 32 such as ITO, SnO$_2$ or ZnO, which is employed as a p-side common electrode for each photoreceptive device array 30A(30B), is formed on the transparent substrate 31. A photodiode PD is formed on the transparent electrode 32 by stacking a p-semiconductor layer 34, an i-semiconductor layer 35 and an n-semiconductor layer 36 to form a pin junction for a photoelectric converting region. The photodiode PD is covered in a passivating film 33 composed of a transparent material. A metallic electrode 37 is formed on the n-layer 36 in each photodiode PD. A metallic wire 38 is formed as an output signal line to connect the metallic electrodes 37 on the plural photodiodes PD commonly in each photoreceptive device array 30A(30B).

The region of the illuminant-side gratings 70 on the transparent substrate 31 includes photodiode structures, as shown in FIG. 6, as is same as the region of the photoreceptive device array 30. These photodiodes are dummy devices. These dummy photodiodes have metallic electrodes 37 patterned as opaque sections of the illuminant-side gratings 70.

The illuminant-side gratings 70 have a grating pitch same as a scale grating pitch P1 of the scale 10 (or an integer multiple of P1 in general).

The dummy photodiodes having the metallic electrode 37 formed thereon are employed as the illuminant-side gratings 70 in FIG. 6. Alternatively, as shown in FIG. 7, the metallic film 37 may be formed directly on the passivating film 33 without the formation of the dummy photodiodes. Preferably, the metallic film 37 may be formed in the same process step as that for the metallic wire 38.

Also in this embodiment, it is possible to manufacture the flat illuminant 20 and the photoreceptive module 30 in individual process steps and assemble a photoelectric encoder only with each accepted part.

Therefore, a yield can be improved and a production cost can be reduced compared to the monolithic manufacture of the light-emitting and photoreceptive sections. In addition, the flat light-emitting diode can be located in the vicinity of the flat photoreceptive module without damaging possibility. This is effective to downsize the apparatus. In the above embodiment, two-phase sine wave signals with A- and B-phases are generated. In addition to these A- and B-phases, their 180°-reversed /A- and /B-phase signals may be generated to provide four-phase sine wave signals. If it is not required to know the direction of the displacement, either of the photoreceptive device arrays 30A and 30B may be omitted to obtain a single-phase sine wave signal.

[Third Embodiment]

A third embodiment of the present invention will be described next on the basis of FIGS. 8–11.

Figure 8:
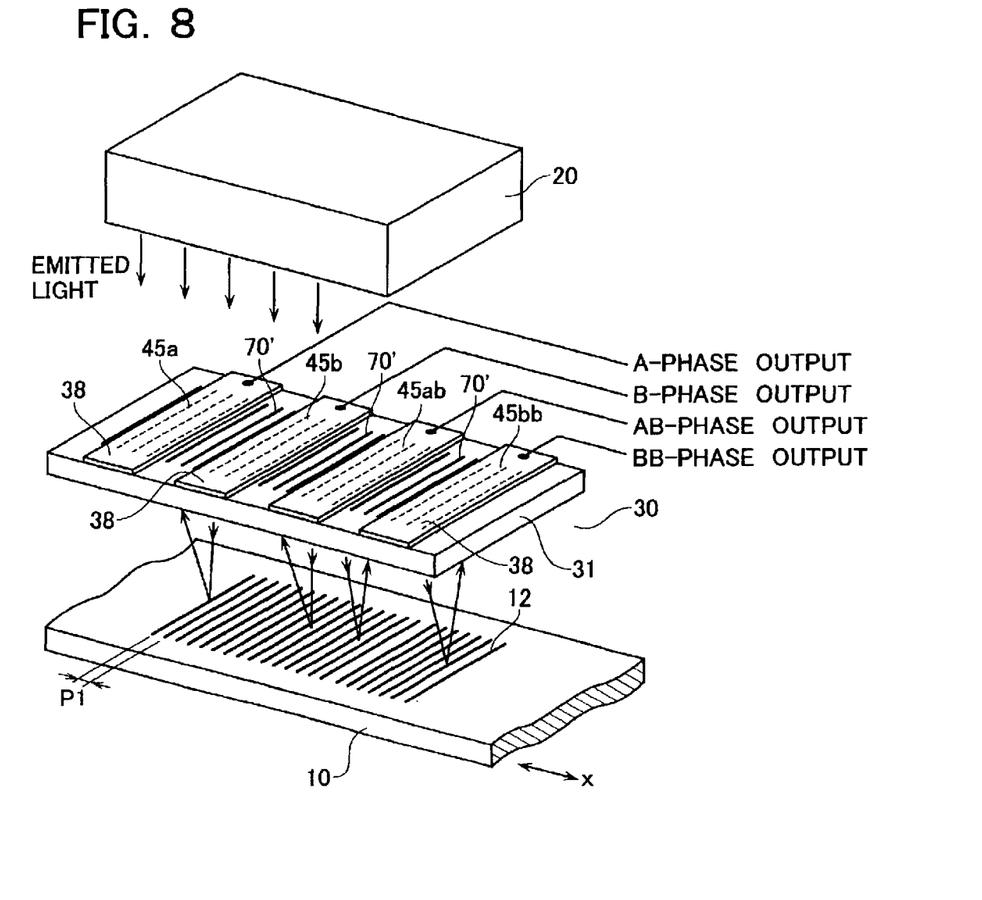
FIG. 8 shows an arrangement of a photoelectric encoder according to a third embodiment of the present invention.
Figure 9:
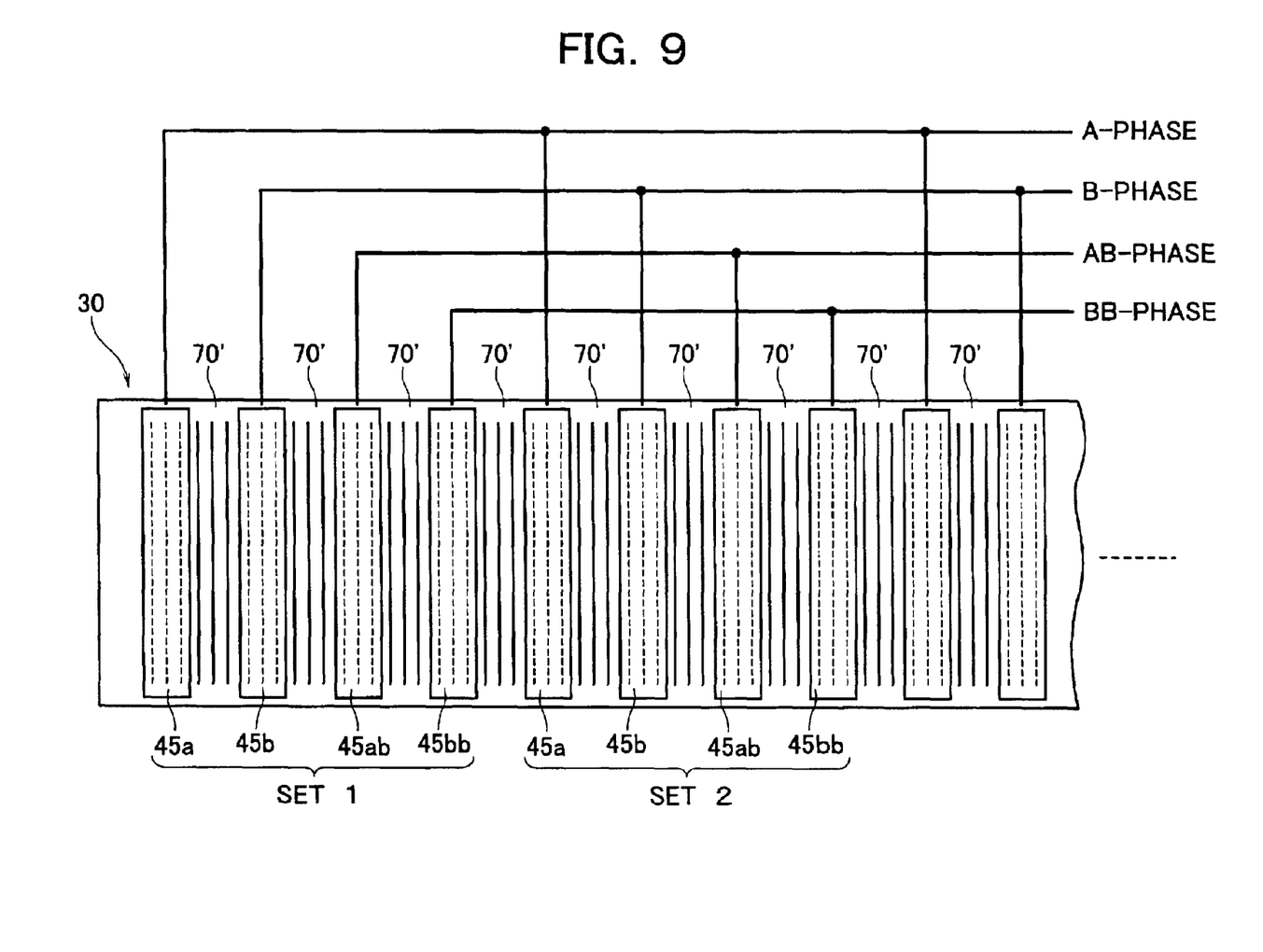
FIG. 9 is a diagram showing an arrangement of plural sets of photoreceptive device groups and index scales located in the same embodiment.

AS shown in FIGS. 8 to 9, the photoreceptive module 30 includes a plurality of photoreceptive device groups 45 (45a, 45b, 45ab, 45bb) formed on the transparent substrate 31 in a surface opposite to the surface facing to the scale 10. It also includes index scales 70' formed between the photoreceptive device groups 45 as illuminant-side gratings for modulating the emitted light. Unlike the previous embodiments, the photoreceptive device groups 45 and the index scales 70' are alternately arranged in the direction of the measurement axis x on the scale 10. The flat illuminant 20 emits such a light that enters almost normal to the index scales 70' thus dispersedly arranged over the photoreceptive module 30. The plural photoreceptive device groups 45 are employed to output A-, B-, AB- and BB-phase displacement signals with a 90°-phase difference from each other. The photoreceptive device groups 45 each contain plural photodiode PD with the same phase.

In a practical photoreceptive module 30, as shown in FIG. 9, plural photoreceptive device groups 45 and index scales 70' are divided into a plurality of sets each including A-, B-, AB- and BB-phases and having output signal lines connected commonly per same phase. This is effective to insure the signal intensity and improve the S/N.

Figure 10:
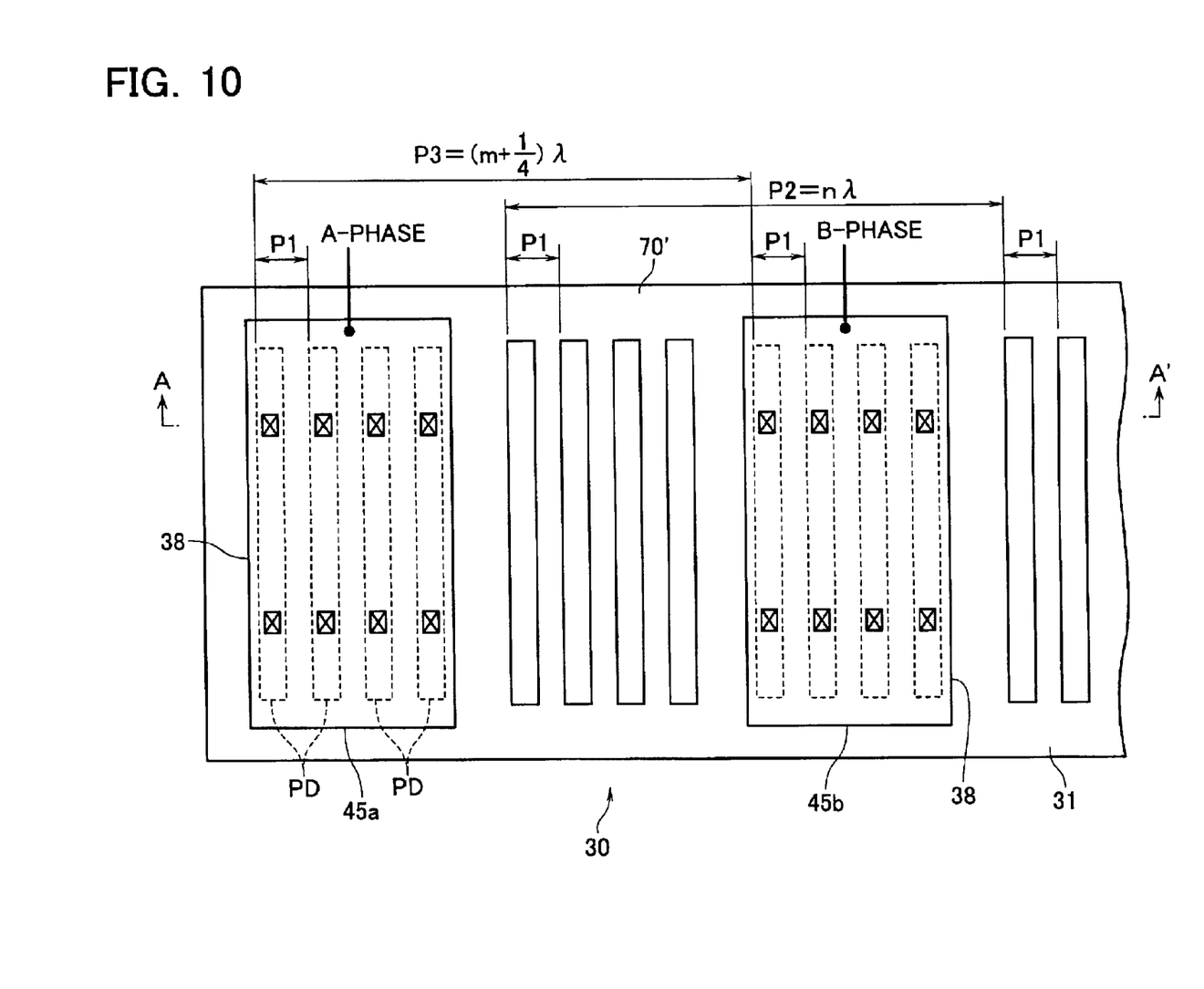
FIG. 10 is a plan view of the photoreceptor module 30 of the same embodiment.
Figure 11:
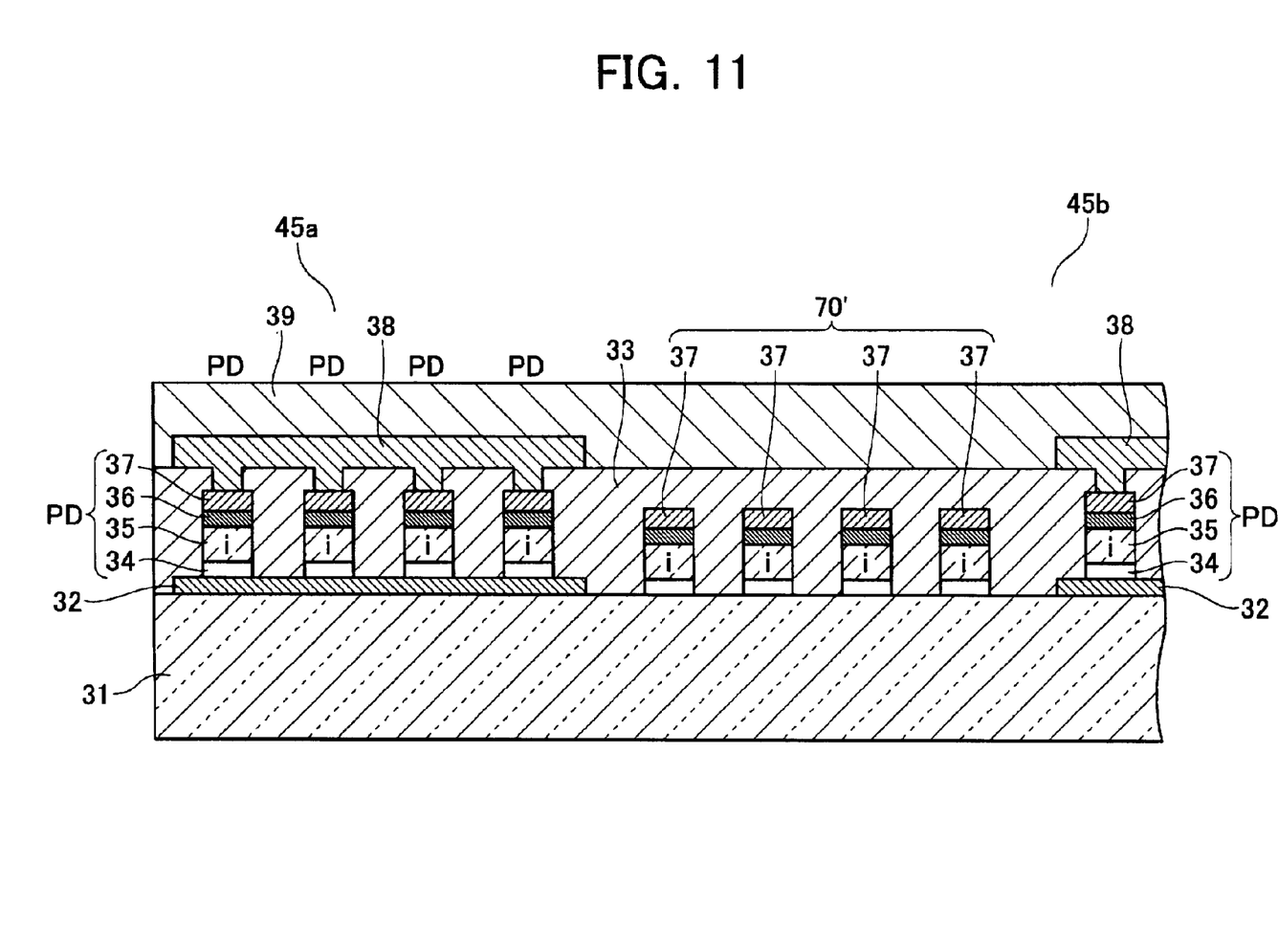
FIG. 11 is a cross-sectional view taken along the A–A' line in FIG. 10.

FIG. 10 is a plan view of the photoreceptive module 30 and FIG. 11 is a cross-sectional view taken along the A–A' line in FIG. 10. A transparent electrode 32 such as ITO, $SnO_2$ or ZnO, which is employed as a p-side common electrode for each photoreceptive device group 45, is formed on the transparent substrate 31. A photodiode PD is formed on the transparent electrode 32 by stacking a p-semiconductor layer 34, an i-semiconductor layer 35 and an n-semiconductor layer 36 to form a pin junction for a photoelectric converting region. The photodiode PD is covered in a passivating film 33 composed of a transparent material. A metallic electrode 37 is formed on the n-layer 36 in each photodiode PD. A metallic wire 38 is formed as an output signal line to connect the metallic electrodes 37 on the plural photodiodes PD commonly in each photoreceptive device group 45.

The region of the index scale 70' on the transparent substrate 31 includes photodiode structures, as shown in FIG. 11, as is same as the region of the photoreceptive device groups 45. These photodiodes are dummy devices. These dummy photodiodes have metallic electrodes 37 patterned as opaque sections of the index scale 70'. Also in this embodiment, the photoreceptive device array 30A (30B) is not employed as the illuminant-side gratings like the second embodiment.

The index scales 70' are formed dispersedly, as shown in FIG. 10, in such a manner that they are sandwiched between the photoreceptive device groups 45. The index scales 70' have a grating pitch same as a scale grating pitch P1 of the scale 10 (or an integer multiple of P1 in general). The index scales 70' dispersed to sandwich the photoreceptive device groups 45 therebetween have an array pitch P2=n·P1 (where n denotes a positive integer). The plural photodiodes PD contained in the photoreceptive device group 45 have the same phase and a pitch of P1 (or an integer multiple of P1 in general). The photoreceptive device groups 45 have an array pitch P3=(m+¼)P1 (where m denotes a positive integer). Thus, the photoreceptive device groups 45 can generate A-, B-, AB- and BB-phase displacement signals with a 90°-phase difference from each other.

The array pitch P3 of the photoreceptive device groups 45 may be set P3=(m+M/4)P1 in general (where m denotes a positive integer and M an odd number) to generate the four-phase outputs. For example, if M=3, the photoreceptive device groups 45 generate A-, B-, AB- and BB-phase displacement signals with a 270°-phase difference from each other.

The array pitch P3 of the photoreceptive device groups 45 may be set P3=(m+⅓)P1 (where m denotes a positive integer) to generate three-phase outputs with a 120°-phase difference from each other.

Thus, in the third embodiment, the photoreceptive device groups 45 and index scales 70' are alternately arranged in the photoreceptive module 30 without overlapping their regions. Therefore, as described above, the material film of the metallic electrode 37 for use in the photoreceptive device groups 45 can be utilized without change as the index scales 70'.

Figure 12:
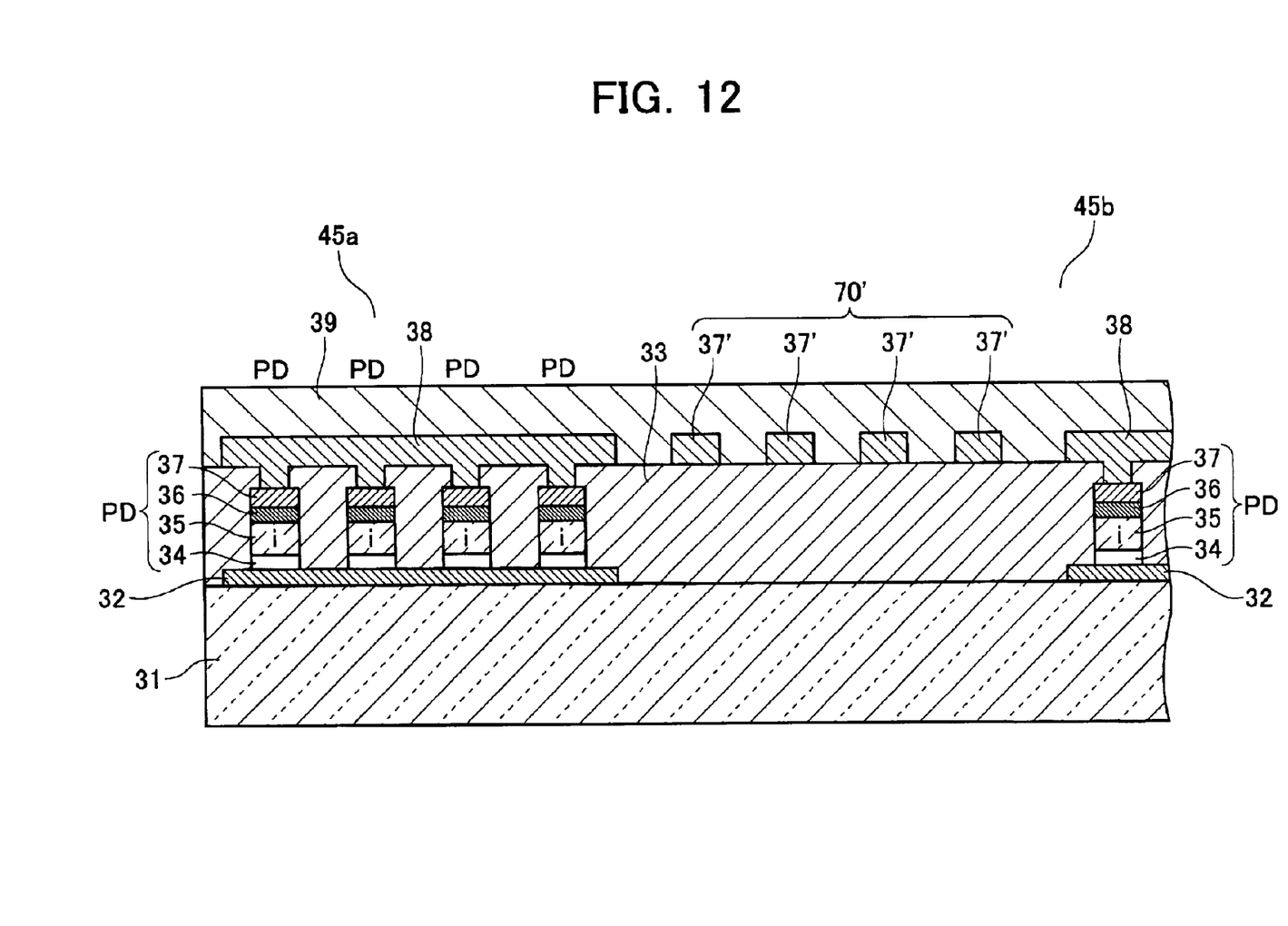
FIG. 12 shows an alternative of the third embodiment.

The dummy photodiodes having the metallic electrode 37 formed thereon are employed as the index scales 70' in the third embodiment. Alternatively, as shown in FIG. 12, the metallic film 37 maybe formed directly on the passivating film 33 without the formation of the dummy photodiodes. Preferably, the metallic film 37 may be formed in the same process step as that for the metallic wire 38.

[Alternatives]

In the above first through third embodiments, one-dimensional scales and one-dimensional photoreceptive arrays are employed for the scale 10. The present invention is not limited in this example. Two-dimensional scales and two-dimensional photoreceptive arrays may also be employed.

In the above first through third embodiments, the semiconductor layers 34, 35 36 are preferably made from amorphous silicon. However, polysilicon may be used instead for gaining better response. Otherwise, ZnSe, CdSe or the like may be used.

In the above first through third embodiments, a photodiode PD is formed on the transparent electrode 32 by stacking a p-semiconductor layer 34, an i-semiconductor layer 35 and an n-semiconductor layer 36 in this order. However, the order may be changed. For example, the layer 36 may be first stacked on the transparent electrode 32, and after that layer 35 and 34 may be stacked in this order.

As described above, for the photoelectric encoder according to the present invention, it is possible to manufacture the flat illuminant and the photoreceptive module in individual process steps and assemble a photoelectric encoder with only each accepted part. Therefore, a yield can be improved and a production cost can be reduced compared to the monolithic manufacture of the light-emitting and photoreceptive sections. In addition, the flat illuminant can be located in the vicinity of the flat light-transmissive member without damaging possibility. This is effective to downsize the apparatus. The support mechanisms for the light-emitting and photoreceptive sections can be simplified to elevate the production efficiency.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A photoelectric encoder, comprising:
    a reflective scale having predetermined reference gratings formed thereon;
    a flat illuminant having a flat surface emitting a beam of light to illuminate over said scale;
    a light transmissive member placed at a location between said flat illuminant and said reflective scale and closer to said flat illuminant;
    illuminant-side gratings formed on said light transmissive member and placed at front surface of said flat illuminant; and
    a photoreceptive device array including a plurality of photoreceptive devices formed inside or on a surface of said light transmissive member for receiving said beam from said flat illuminant through said illuminant-side gratings and reflected from said reference gratings.

2. The photoelectric encoder according to claim 1, wherein said illuminant-side gratings comprise an electrode film disposed on said plurality of photoreceptive devices at said flat illuminant side for supplying a drive current to said plurality of photoreceptive devices.

3. The photoelectric encoder according to claim 1, further comprising a deflective optical member which is formed at a location on said light transmissive member opposing to said flat illuminant and deflects said beam from said flat illuminant.

4. The photoelectric encoder according to claim 1, wherein said photoreceptive device array is divided into a plurality of photoreceptive device groups having different phases in signals detected thereby, and said photoreceptive device groups and said illuminant-side gratings are arranged alternately along a measurement axis in said reflective scale.

5. The photoelectric encoder according to claim 4, wherein said illuminant-side gratings are formed in the same process step and from the same material as that of forming a metallic film for wiring said photoreceptive device array.

6. The photoelectric encoder according to claim 4, wherein said illuminant-side gratings comprise a dummy device having the same structure as that of said photoreceptive device and a metallic film formed on said dummy device.

7. The photoelectric encoder according to claim 1, wherein said photoreceptive device array is provided beside said illuminant-side gratings.

8. The photoelectric encoder according to claim 7, further comprising a deflective optical member which is formed at a location on said light transmissive member opposing to said flat illuminant and deflects said beam from said flat illuminant.

9. The photoelectric encoder according to claim 7, wherein said illuminant-side gratings are formed in the same process step and from the same material as that of forming a metallic film for wiring said photoreceptive device array.

10. The photoelectric encoder according to claim 7, wherein said illuminant-side gratings comprise a dummy device having the same structure as that of said photoreceptive device and a metallic film formed on said dummy device.

* * * * *